(12) United States Patent
Danielsson Fan et al.

(10) Patent No.: US 12,149,710 B2
(45) Date of Patent: Nov. 19, 2024

(54) METHODS AND SYSTEMS FOR ENCODING AND DECODING OF VIDEO DATA IN CONNECTION TO PERFORMING A SEARCH IN THE VIDEO DATA

(71) Applicant: Axis AB, Lund (SE)

(72) Inventors: Xing Danielsson Fan, Lund (SE); Niclas Danielsson, Lund (SE)

(73) Assignee: Axis AB, Lund (SE)

( * ) Notice: Subject to any disclaimer, the term of this patent is extended or adjusted under 35 U.S.C. 154(b) by 323 days.

(21) Appl. No.: 17/942,642

(22) Filed: Sep. 12, 2022

(65) Prior Publication Data

US 2023/0130970 A1 Apr. 27, 2023

(30) Foreign Application Priority Data

Oct. 25, 2021 (EP) .................................. 21204471

(51) Int. Cl.
*H04N 19/167* (2014.01)
*G06F 16/738* (2019.01)
*G06F 16/783* (2019.01)

(52) U.S. Cl.
CPC ......... *H04N 19/167* (2014.11); *G06F 16/739* (2019.01); *G06F 16/7837* (2019.01)

(58) Field of Classification Search
None
See application file for complete search history.

(56) References Cited

U.S. PATENT DOCUMENTS

| | | | |
|---|---|---|---|
| 6,178,204 B1 | 1/2001 | Hazra | |
| 8,356,114 B2 * | 1/2013 | Mukherjee | H04N 19/17 709/247 |
| 10,271,056 B2 | 4/2019 | Miyahara et al. | |
| 2002/0118862 A1 | 8/2002 | Sugimoto et al. | |
| 2008/0075373 A1 * | 3/2008 | Okada | H04N 19/537 375/E7.182 |
| 2008/0152245 A1 | 6/2008 | El-Maleh et al. | |
| 2015/0264357 A1 | 9/2015 | Alfonso | |
| 2015/0373341 A1 * | 12/2015 | Davies | H04N 19/139 375/240.02 |

(Continued)

FOREIGN PATENT DOCUMENTS

| | | |
|---|---|---|
| DE | 102014210140 A1 | 12/2014 |
| EP | 1793608 A1 | 6/2007 |
| WO | 2010/033642 A2 | 3/2010 |

OTHER PUBLICATIONS

Extended European Search Report dated Mar. 16, 2022 for European Patent Application No. 21204471.3.

*Primary Examiner* — Stuart D Bennett
(74) *Attorney, Agent, or Firm* — Volpe Koenig

(57) ABSTRACT

There are provided encoding and decoding methods, and corresponding systems which are beneficial in connection to performing a search among regions of interest, ROIs, in encoded video data. In the encoded video data, there are independently decodable ROIs. These ROIs and the encoded video frames in which they are present are identified in metadata which is searched responsive to a search query. The encoded video data further embeds information which associates the ROIs with sets of coding units, CUs, that spatially overlap with the ROIs. In connection to independently decoding the ROIs found in the search, the embedded information is used to identify the sets of CUs to decode.

14 Claims, 4 Drawing Sheets

(56) References Cited

U.S. PATENT DOCUMENTS

| | | |
|---|---|---|
| 2018/0270287 A1 | 9/2018 | Ouedraogo et al. |
| 2019/0147914 A1* | 5/2019 | Puri .................. H04N 21/4722 725/24 |
| 2019/0251364 A1* | 8/2019 | Park ....................... G06V 20/47 |
| 2019/0320189 A1* | 10/2019 | Cooper .................. H04N 19/70 |

* cited by examiner

METHODS AND SYSTEMS FOR ENCODING AND DECODING OF VIDEO DATA IN CONNECTION TO PERFORMING A SEARCH IN THE VIDEO DATA

FIELD OF INVENTION

The present disclosure relates to the field of searching in encoded video data. In particular, it relates to encoding of video data to facilitate searching in the encoded video data and decoding of encoded video data in connection to performing a search in the encoded video data.

TECHNICAL BACKGROUND

Video cameras are commonly used for surveillance purposes. The video cameras produce video data which is stored in an encoded format for later retrieval. For example, when an incident has been reported, one may retrieve the stored video data to find specific content therein, such as finding a specific person or persons having a particular colour on their clothes. Manually looking through the video data for the specific content is extremely tedious, and may not even be feasible for larger camera installations. Therefore, search procedures which automatically search the video data have been proposed.

These automatic search procedures are driven by metadata associated with the encoded video data. The metadata may indicate in which video frames there are regions of interest (ROIs) and possibly also where in those video frames the ROIs are located. For example, the metadata may indicate in which frames there are objects, and bounding boxes of those objects within the frames. By searching in the metadata, relevant video frames to analyze further may be identified without having to decode the video data. Having found the relevant video frames, the automatic search procedure may next proceed to decode the relevant frames and analyze whether the decoded video data within the ROIs matches a specific search criterium.

A drawback with these automatic search procedures is that they are slow and processing intense and therefore not suitable for searching in larger video materials, such as in a video material collected by camera installations with more than a few cameras. One reason for that is that decoding of the relevant video frames is inefficient. To see that this is the case it is noted that, when encoding video data, most of the video frames are typically inter-encoded by referring to other video frames. Such frames are also known as P-frames or B-frames. Only once in a while a video frame is intra-coded, i.e., encoded independently of other video frames. Intra-coded frames are also known as I-frames. This means that in order to decode a specific frame in the video data one has to start decoding from the nearest preceding intra-coded frame, and then decode the inter-coded frames leading up to the specific frame. Accordingly, a lot of video frames which are irrelevant for the search have to be decoded in order to decode the video frames which are relevant to the search. Further, it is noted that video frames traditionally are encoded and decoded macroblock-by-macroblock in a raster scan direction. Accordingly, one would decode the whole video frame even if only a small region of the video frame is of interest. For example, in surveillance scenarios it is not uncommon that an object of interest in a video frame covers only 100×50 pixels, or even less, which is a negligible part of a typical video frame of a video. There is thus room for improvements.

SUMMARY

In view of the above, mitigating the above problems and providing video encoding and video decoding methods that contribute to making a search in encoded video data more efficient would be desirable.

The disclosure is defined by the attached independent claims, while embodiments of the disclosure are defined by the dependent claims.

According to a first aspect of the disclosure, there is provided a method and a system for decoding video data in connection with performing a search in the video data.

The decoding method comprises:
receiving encoded video data which includes encoded video frames in which there are independently decodable regions of interest, wherein information which associates each independently decodable region of interest with a set of coding units that spatially overlap with the independently decodable region of interest is embedded in the encoded video data,
receiving metadata identifying the independently decodable regions of interest and the encoded video frames in which they are present,
receiving a search query relating to a search among regions of interest in the encoded video data,
in response to receiving the search query, searching in the metadata to find one or more independently decodable regions of interest and the encoded video frames in which they are present,
for each independently decodable region which is present in an encoded video frame and which was found when searching:
identifying a set of coding units being associated with the independently decodable region of interest by using the information embedded in the encoded video data, and
decoding the identified set of coding units of the encoded video frame independently of video data in other video frames and independently of video data in coding units outside of the set of coding units in the encoded video frame to produce decoded video data corresponding to the independently decodable region of interest.

According to this decoding method, at least some of the ROIs in the received encoded video data are independently decodable. This means that video data within a ROI is encoded in such a way that it can be decoded without first decoding any previous video frames or any other regions in the same video frame. In order to implement independent decoding of video data in such an ROI in practice, the decoder needs to be informed which coding units in which video frame that correspond to the ROI. Once this is known to the decoder, it can selectively decode those coding units without first decoding any other coding unit of the same or another video frame.

A two-stage procedure is proposed in order to inform the decoder regarding which coding units in which video frames to decode responsive to a search query. The first stage relies on metadata which identifies the independently decodable ROIs and the encoded video frames in which they are present. When a search query is received, the metadata may hence be searched to find one or more independently decodable ROIs and the encoded video frames in which they are present. The second stage relies on information embedded in the encoded video data which associates each independently decodable ROI identified by the metadata with a set of coding units that spatially overlap with the ROI. The embedded information hence allows identification of sets of coding units being associated with the independently decodable ROIs in the encoded video frames that were found during the search. In the end, the identified sets of coding units in those encoded video frames may be selectively decoded.

Accordingly, the metadata and the information embedded in the video data allows independently decodable ROIs to be selectively decoded responsive to a search query without having to decode any video data apart from the selected ROIs. In this way, the search in the video data becomes more efficient.

A region of interest in a video frame refers to a pixel area in the video frame which may be of particular interest to a user. A region of interest may for example correspond to a pixel area of a detected object in the video frame.

The search in the video data may generally relate to a search for ROIs in the video data that match a particular search query. The search may be made for forensic purposes, i.e., it may be a forensic search where the purpose of the search is to find evidence in the video material. For example, one may want to find all persons wearing a blue jacket or one may want to find out if a particular person is depicted in the video data.

By a coding unit is meant a block of pixels in an image frame that forms a basic processing unit used during encoding. Depending on coding standard, the coding units are also known as macroblocks (H.264) or coding tree units (H.265).

The metadata identifying the independently decodable regions of interest and the encoded video frames in which they are present is associated with the encoded video data, but is typically provided as a separate data entity such as a separate metadata stream. Hence the search can be conducted in the metadata without having to parse the encoded video data. It is also possible to have the metadata embedded in the video data.

By information being embedded in the encoded video data is meant that the information is included among the encoded video frames. The information is however readable from the encoded video data without having to first decode the video data itself. For example, the information may be embedded in headers, such as picture parameter set (PPS) headers, of the encoded video frames or in dedicated supplementary enhancement information (SEI) frames which are inserted in the encoded video data.

By a ROI in an encoded video frame being independently decodable is meant that it can be decoded by only using or referring to encoded video data in coding units of the encoded video frame that spatially overlap with the ROI. Differently stated, video data in the ROI is encoded without referring to any video data outside of the ROI in the same frame or to video data in another frame. For example, the video data in the set of coding units that spatially overlap with the ROI may be intra-encoded. The intra-encoding may be spatially constrained within the independently decodable region of interest, i.e., the intra-encoding only makes references to video data inside of the ROI.

The search query may relate to a search among ROIs in the encoded video data having a particular attribute or a particular combination of attributes. By attribute of a ROI is meant an attribute, or characteristic, of the video data within the ROI. For example, if the ROI corresponds to an object, it may be an attribute or characteristic of the object, such as an object class, a colour of the object, an identity of the object, an item worn or carried by the object, such as a hat or a bag. In some cases, video data in the ROIs may already have been analyzed and tagged with attributes before it was encoded. In that case, the metadata may further be indicative of attributes of the independently decodable regions of interest, and the searching may include searching in the metadata to find one or more independently decodable ROIs having an attribute that matches the particular attribute of the search query. While this requires more processing to be carried out at the encoding side, it saves processing power at the decoding side since only ROIs having the attribute of interest are found in the search and need to be decoded.

In other cases, when the metadata does not tag the ROIs with attributes, the method may analyze the decoded video data corresponding to the independently decodable ROI to determine if it matches the particular attribute of the search query. This requires more processing power at the decoding side since also video data of ROIs which in the end do not match the search query needs to be decoded. However, the processing burden on the encoding side is at the same time reduced.

The metadata may include an identifier of each independently decodable ROI in an encoded video frame, and the information embedded in the encoded video data may associate the identifier of each independently decodable ROI with coding units that spatially overlap with the independently decodable ROI. The use of an identifier is an efficient way of linking ROIs with coding units in the encoded video frames.

According to a second aspect of the disclosure, there is provided a method, and a system for encoding video data.

The encoding method comprises:
  receiving video data which includes video frames in which there are regions of interest,
  receiving first metadata identifying the regions of interest and in which video frames they are present,
  selecting, by using the first metadata, one or more video frames and one or more regions of interest in each of them,
  encoding the video data to produce encoded video data, wherein the encoding of each selected video frame and each selected region of interest therein includes:
    associating the region of interest with a set of coding units that spatially overlap with the region of interest,
    encoding video data of the video frame in the set of coding units that spatially overlap with the region of interest independently of video data in other video frames and independently of video data in coding units outside of the set of coding units in the video frame,
    embedding information in the encoded video data which associates the region of interest with the set of coding units that spatially overlap with the region of interest, and
    generating second metadata which identify the region of interest in the video frame as being independently decodable.

This encoding method hence encodes at least some of the ROIs in the video frames independently of video data in other video frames and independently of video data in coding units outside of the ROI. Any references to other video data used when encoding of these ROIs is hence constrained to be within the ROI. Further, the encoding method generates metadata which identifies the independently decodable ROIs and the video frames in which they are present, and embeds information in the encoded video data which associates each independently decodable ROI with a set of coding units that spatially overlap with the region of interest. Thus, as explained above, the encoding method enables the independently decodable ROIs to be selectively decoded at a decoder side responsive to a search query without having to decode any video data apart from the selected ROIs. In this way, the search in the video data becomes more efficient.

In some embodiments, the selected one or more video frames may correspond to all video frames in which there are ROIs. For example, all video frames in which there are ROIs and all ROIs therein may be selected. In other embodiments, the selected one or more video frames may include a strict subset of the video frames in which there are ROIs. Accordingly, fewer than all ROIs may be encoded in an independent fashion. Since the independent encoding typically is more expensive in terms of bitrate, one may save bitrate by not encoding all ROIs independently. To this end it is noted that the ROIs which are not independently encoded are still encoded and may still be decoded at the decoder side, albeit at the cost of decoding the whole frame in which the ROI is present and any preceding video frame starting from the latest intra-coded frame.

Various approaches may be used select which ROIs to encode independently. According to a first approach, the first metadata further identifies a plurality of regions of interest in subsequent video frames as belonging to a common track, wherein the selected one or more video frames include fewer than all of said subsequent video frames. Thus, when an ROI moves between subsequent video frames, such as when the video data captures a movement of an object, one can select to independently encode the ROI in one or a few, but not all, of the subsequent video frames. This saves bitrate at the same time as efficient searching is enabled for ROIs belonging to a common track. This since it is often enough for search purposes to decode the ROI in one or a few frames of a track rather than to decode the whole track.

According to a second approach, the selected one or more video frames and the selected one or more regions of interest in each of them are further identified based on closeness of image properties within the ROIs to target image properties. The image properties may include one or more of a lighting condition, an occlusion ratio of a depicted object, and a pose of a depicted object. Thus, when selecting what ROIs to encode independently, one may select those that have favorable image properties. The second approach is combinable with the first approach. For example, when selecting which ROIs in the common track to independently encode, one can select those that have the most favorable image properties. In one example, one could pick that or those ROIs in the common track where a depicted object faces the camera, where the lighting conditions are the best, and/or where the depicted object is least occluded.

While having independently encoded ROIs in the encoded video data increases the bitrate of the encoded video, the additional bitrate cost is for typical surveillance scenarios quite low since the areas covered by the ROIs are small in relation to the area of the video frames. Also, in most surveillance scenarios, the time intervals when there are no ROIs in the frames is longer than the time intervals when there are ROIs in the frames. Still, in order to control the bitrate per frame or over time, it is possible to introduce an upper limit for the amount (or number) of pixels that are allowed to be independently encoded per time unit or per frame. In particular, an amount of pixels in the video data covered by the selected one or more ROIs in the selected one or more video frames may be less than a predetermined proportion of a total amount of pixels in the video data per time unit or per selected video frame. Accordingly, this allows for setting a limit on how much extra bitrate one can tolerate in order to optimize search times for a search application.

The encoding method may further comprise analyzing the video data within the ROIs to associate them with attributes, and including the attributes of the regions of interest in the second metadata. As explained above, this saves processing power at the decoding side since it allows ROIs having attributes that match the search query to be identified before the decoding takes place.

According to a third aspect of the disclosure, there is provided a non-transitory computer-readable medium having computer-code instructions stored thereon which, when executed by a device having processing capability, causes the device to carry out the decoding method of the first aspect or the encoding method of the second aspect.

The third aspect may generally have the same features and advantages as the first aspect and second aspects. It is further noted that the disclosure relates to all possible combinations of features unless explicitly stated otherwise.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION

The present disclosure will now be described more fully hereinafter with reference to the accompanying drawings, in which embodiments of the disclosure are shown. The systems and devices disclosed herein will be described during operation.

Figure 1:
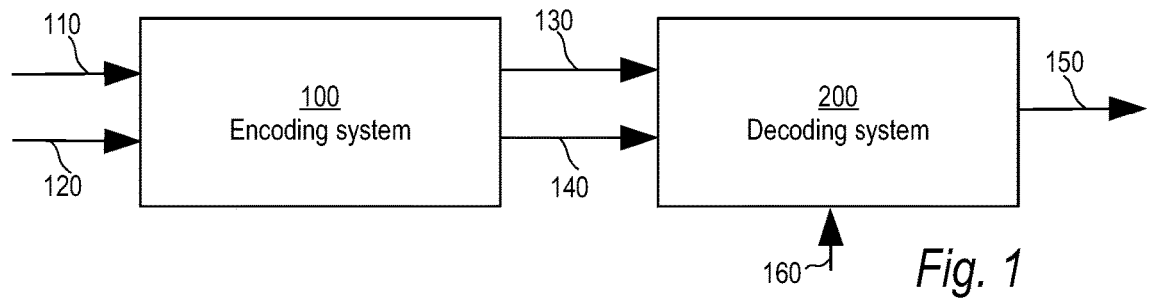
FIG. 1 schematically illustrates an encoding system and a decoding system according to embodiments.

FIG. 1 illustrates a video encoding system 100 and a corresponding video decoding system 200. The video encoding system 100 and video decoding system 200 are specifically designed to facilitate efficient search in video data. The video encoding system 100 may be included in a video camera. The decoding system 200 may be included in a video management system.

Figure 2:
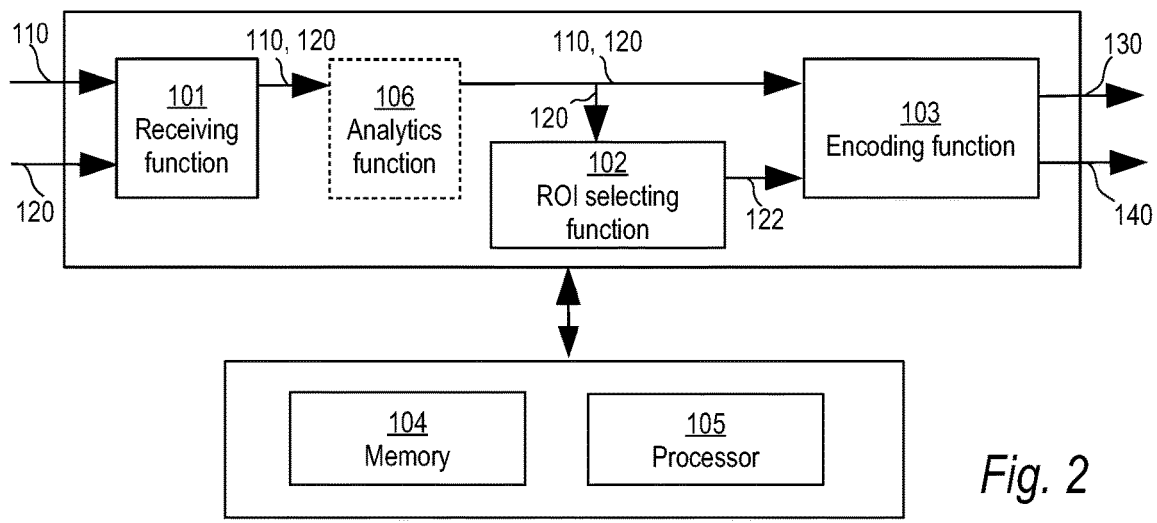
FIG. 2 schematically illustrates the encoding system according to embodiments.
Figure 3:
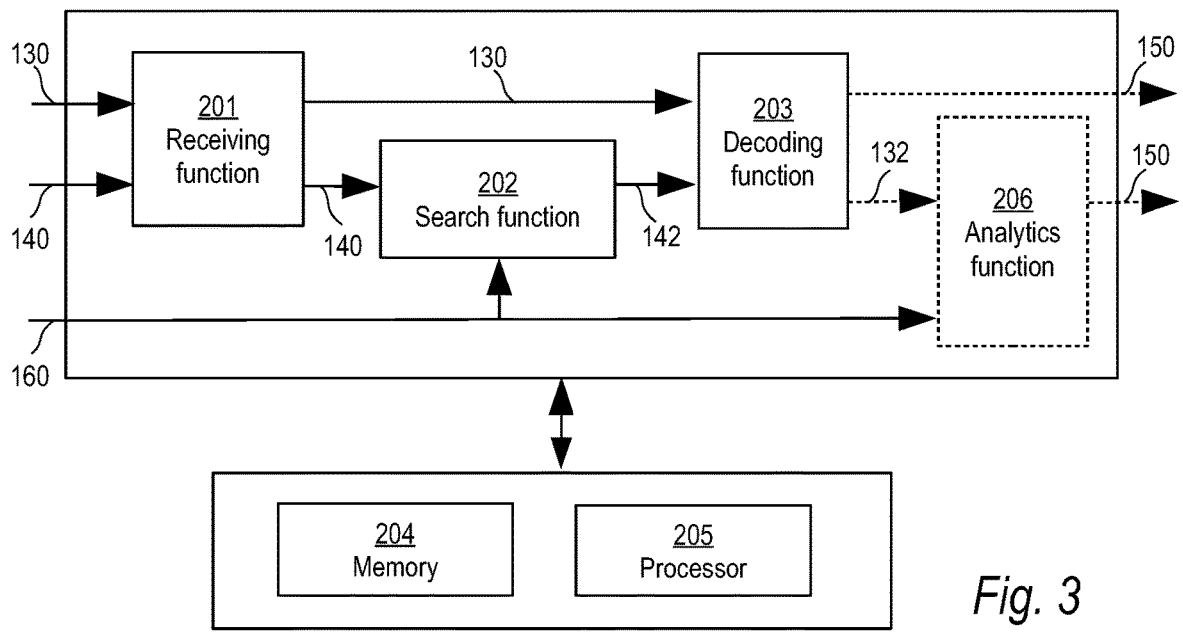
FIG. 3 schematically illustrates the decoding system according to embodiments.

FIGS. 2 and 3 illustrate the encoding system 100 and the decoding system 200 in more detail. Generally, the encoding system 100 comprises circuitry which is configured to implement a receiving function 101, a ROI selecting function 102, and an encoding function 103. Optionally, the circuitry of the encoding system 200 may also be configured to implement an analytics function 106. Likewise, the decoding system 200 comprises circuitry which is configured to implement a receiving function 201, a search function 202, and a decoding function 203. Optionally, the circuitry of the decoding system 200 may also be configured to implement an analytics function 206.

In a hardware implementation, each of the functions 101, 102, 103, 106, 201, 202, 203, 206 may correspond to circuitry which is dedicated and specifically designed to carry out the function. The circuitry may be in the form of one or more integrated circuits, such as one or more application specific integrated circuits or one or more field-programmable gate arrays. By way of example, the encoding function 103 may comprise circuitry which, when in use, encodes the video data to produce encoded video data.

In a software implementation, the circuitry may instead be in the form of a processor 105, 205, such as a microprocessor, which in association with computer code instructions stored on a (non-transitory) computer-readable medium 104, 204, such as a non-volatile memory, causes the encoding system 100 and decoding system 200 to carry out any method disclosed herein. Examples of non-volatile memory include read-only memory, flash memory, ferroelectric RAM, magnetic computer storage devices, optical discs, and the like. In a software case, the functions 101, 102, 103, 106, 201, 202, 203, 206 may thus each correspond to a portion of computer code instructions stored on the computer-readable medium, that, when executed by the processor 104 or 204, causes the encoding system 100 or decoding system 200 to carry out these function.

It is to be understood that it is also possible to have a combination of a hardware and a software implementation, meaning that the functionality of some of the components 101, 102, 103, 106, 201, 202, 203, 206 are implemented in hardware and others in software.

Figure 7:
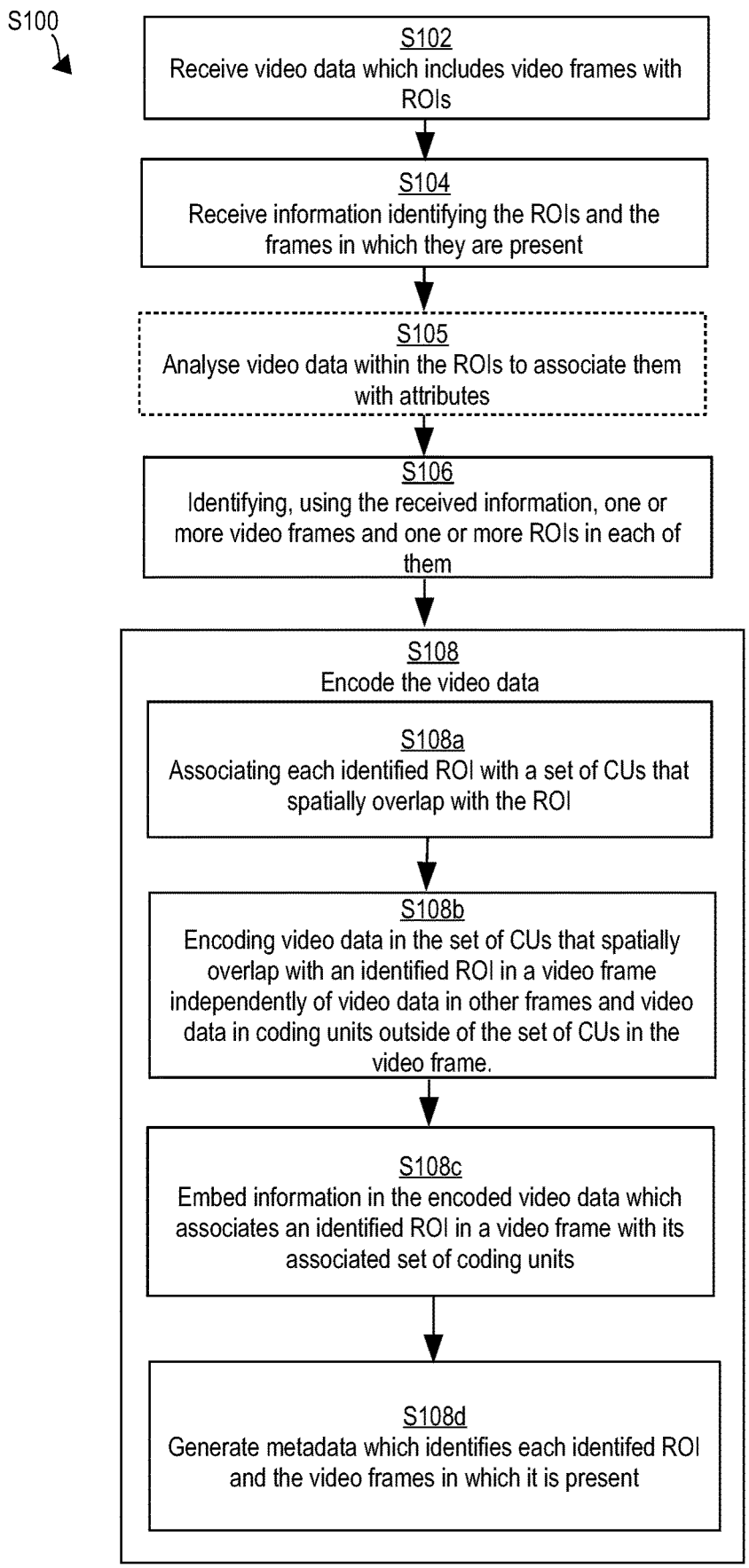
FIG. 7 is a flowchart of an encoding method according to embodiments.

The operation of the encoding system 100, when carrying out a method S100 for encoding video data will now be explained with reference to FIGS. 1, 2, 4, 5, and the flow chart of FIG. 7.

In steps S102 and S104, the receiving function 101 receives video data 110 and first metadata 120, respectively. As further illustrated in FIG. 4, the video data 110 includes video frames 110-1, 110-2, 110-3, 110-4, 110-5, 110-6 in which there are ROIs 112. In the illustrated example, there are two ROIs in each of video frames 110-1 and 110-2 and one ROI in each of video frames 110-3 and 110-6. As is common during long periods of time in surveillance videos there are also video frames 110-4 and 110-5 in which there are no ROIs. The ROIs may correspond to objects detected in the video frames. In this case the ROIs correspond to persons and cars.

The first metadata 120 includes information which identifies the ROIs 112 and the video frames in which they are present. The first metadata 120 is typically provided as a separate data entity from the video data, but it is also possible to embed it in the video data 110 for example by using supplemental enhancement information (SEI) frames. The first metadata 120 is generated upstream of the video encoding system 100, for example in connection to detecting objects in the video data 110. For that purpose, any object detection algorithm known in the art may be used. The first metadata 120 may include data units 120-1, 120-2, 120-3, 120-6 which each identifies a video frame in the video data 110 and includes information about ROIs in that video frame. In more detail, the first metadata 120 may include identifiers of the video frames 110-1, 110-2, 110-3, 110-6 in which there are ROIs. The first metadata 120 may further include an identifier of each ROI in the video frames 110-1, 110-2, 110-3, 110-6. These identifiers may be given in terms of frame number, and a number of each ROI in the frame.

In addition to the identifiers, the first metadata 120 may also for each ROI specify spatial coordinates of the ROI in the video frame. The spatial coordinates define a spatial coverage of the ROI in the video frame, i.e., the pixels in the video frame that are included in the ROI. For example, it may specify spatial coordinates of a bounding box which defines the outline of the ROI. The spatial coordinates may be given in terms of pixel coordinates within the video frame.

Optionally, the first metadata 120 may further include an object identifier in association with a ROI, where ROIs depicting the same physical object are associated with the same object identifier. The object identifier may hence be used to identify ROIs depicting the same object. As a special example, in situations when tracking has been performed upstream of the video encoding system 100, the first metadata 120 may indicate whether a ROI in a video frame belongs to a track which spans over a plurality of subsequent video frames, and if so include an identifier of the track in association with the ROI. In the illustrated example of FIG. 4, the ROIs corresponding to the person in video frames 110-1, 110-2, 110-3 form a track, and the ROIs corresponding to the car in video frames 110-1 and 110-2 form another track.

In some embodiments, the video data 110 and the first metadata 120 are input to an optional analytics function 106 which in step S105 analyzes the video data within the ROIs may to associate the ROIs with attributes. Such analysis, which per se is known in the art, may include object classification, object recognition, colour recognition, etc., The information in the first metadata 120 may be updated to further specify the attributes of each ROI. Examples of attributes are object class, such as person or car, and colour information. As will be explained, these attributes may be used for search purposes in the decoding system 200. In alternative embodiments, the analytics function 106 may instead be located upstream of the encoding system 100.

The first metadata 120 may also include image properties of the ROIs, such as a lighting condition within the ROI, an occlusion ratio of a depicted object, and a pose of a depicted object. The image properties of a ROI may generally be said to reflect a quality of the video data within the ROI for a specific purpose, such as an object recognition purpose. The image properties may be determined by the analytics function 106 or may have been determined upstream of the encoding system 100.

Figure 4:
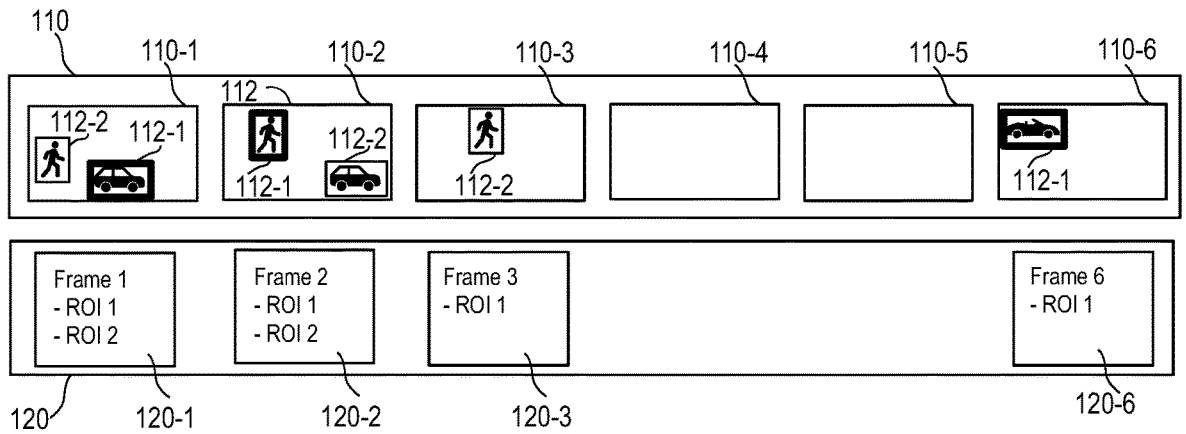
FIG. 4 schematically illustrates video data and associated first metadata.

In step S106, the ROI selecting function 102 uses the information in the first metadata 120 to select one or more of the video frames and one or more ROIs in each of them. The ROI selecting function 102 passes on an indication 122 of the selected ROIs and the video frames in which they are present to the encoding function 103. In some embodiments, the ROI selecting function 102 may select all video frames in which there are ROIs, and all ROIs in each of them. In other embodiments, the ROI selecting function 102 may instead identify or select a strict subset of the ROIs, for example by selecting a strict subset of the video frames in which there are ROIs, or by selecting a strict subset of the ROIs within a video frame. That is, the ROI selecting function 102 may select fewer than all of the video frames in which there are ROIs, and/or fewer than all of the ROIs. As noted above, the reason for not selecting all frames and/or all ROIs is to save bitrate during the subsequent encoding. In the example of FIG. 4, the ROI selecting function 102 has selected ROIs 112-1, as indicated by the thicker border around those ROIs, but not ROIs 112-2. The selected ROIs 112-1 include ROI 2 (the car) in video frame 110-1, ROI 1 in video frame 110-2, and ROI 1 (the sports car) in video frame 110-6.

In cases where a plurality of ROIs in different video frames depict the same object as indicated by the object identifier in the first metadata 120, the ROI selecting function 102 may select one or a few, but not all, ROIs depicting the object. As a special case, when a plurality of ROIs forms a track which spans over subsequent video frames as indicated by a track identifier in the first metadata 120, the ROI selecting function 102 may select one or a few, but not all, ROIs that belong to the track. Accordingly, among ROIs having the same track identifier, the ROI selecting function 120 may select one or a few ROIs in corresponding one or a few video frames which will then serve as representatives for the track. In the example of FIG. 4, the ROIs corresponding to the person in video frames 110-1, 110-2, 110-3 form a track, and the ROI selecting function 102 selects the ROI 112-1 in the second video frame 110-2 as a representative of the track. Similarly, the ROIs corresponding to the car in video frames 110-1 and 110-2 form a track, and the ROI selecting function 102 selects the ROI 112-1 in the first video frame 110-1 as a representative of the track.

In order to identify which one or ones to select among a plurality of ROIs that depict the same object, such as among ROIs belonging to a common track, the ROI selecting function 102 may further consider image properties of the ROIs as specified by the information in the first metadata 120. The ROI selecting function 102 may compare the image properties of the ROIs to target image properties, and select the ROI or ROIs having image properties which are closest to the target image properties. The target image properties may reflect image properties which are desirable for a specific purpose, such as an object recognition purpose. According to some examples, the ROI or ROIs having a lighting condition which is closest to a target lighting condition may be selected, the ROI or ROIs for which the pose of the depicted object best matches a target pose may be selected, or the ROI or ROIs having the smallest occlusion ratio may be selected. In the example of FIG. 4, it could for example be the case that the person in the second video frame 110-2 faces the camera and therefore is selected while the person in video frames 110-1, 110-3 is turned away from the camera and is therefore not selected. In this way, the ROI selecting function 102 may select those ROIs which have the best properties of the video data for the given purpose. These examples may be combined such that several image properties, possibly with different priorities, are taken into account in the selection. The image properties may also be taken into account when deciding how many ROIs to select from the plurality of ROIs. In many cases, it may be enough to select the ROI that best matches the target image properties. However, in other approaches, all ROIs having an image property which is closer to the target image properties than a predetermined threshold may be selected.

The ROI selecting function 102 may further be subject to a restriction which limits the proportion of the total amount of pixels which is allowed to be covered by a selected ROI per video frame and/or per time unit, such as per group of pictures (GOP). The proportion may be predetermined and may be considered as a tuning parameter of the encoding system 100. In order to meet this limitation, the ROI selecting component 102 may compare the amount of pixels in the video data which is included in the selected ROIs, as specified by the information in the first metadata 120, to the total amount of pixels per frame and/or per time unit. If the proportion exceeds the limit, the ROI selecting function 102 needs to reduce the number of selected ROIs, and if the proportion is not exceeded there may be room for selecting additional ROIs. This procedure may be repeated by the ROI selecting function 102 until the limit is not exceeded, or until it is not possible to add any further ROIs without exceeding the limit. Another option to reduce bitrate is to apply a higher compression the video data outside of the ROIs than to the video data inside of the ROIs when encoding.

Rather than setting a proportion in terms of the total amount of pixels per frame or time unit which are allowed to be covered by a selected ROI, one could set an upper bound for the bitrate. This upper bound could be based on bitrate measurements or estimates in a given scene, with a given resolution, frame rate and video configuration. If the bitrate goes above the upper bound, the ROI selecting component 102 reduces the number of selected ROIs, and if the bitrate is below the upper bound, the ROI selecting component 102 may select additional ROIs as long as the upper bound is not exceeded.

The encoding function 103 receives the video data 110, the first metadata 120 and the indication 122 of the ROIs and the associated video frames that were selected by the ROI selecting function 102. The encoding function 103 encodes the video data 110 in step S108 to produce encoded video data 130 and second metadata 140.

Figure 5:
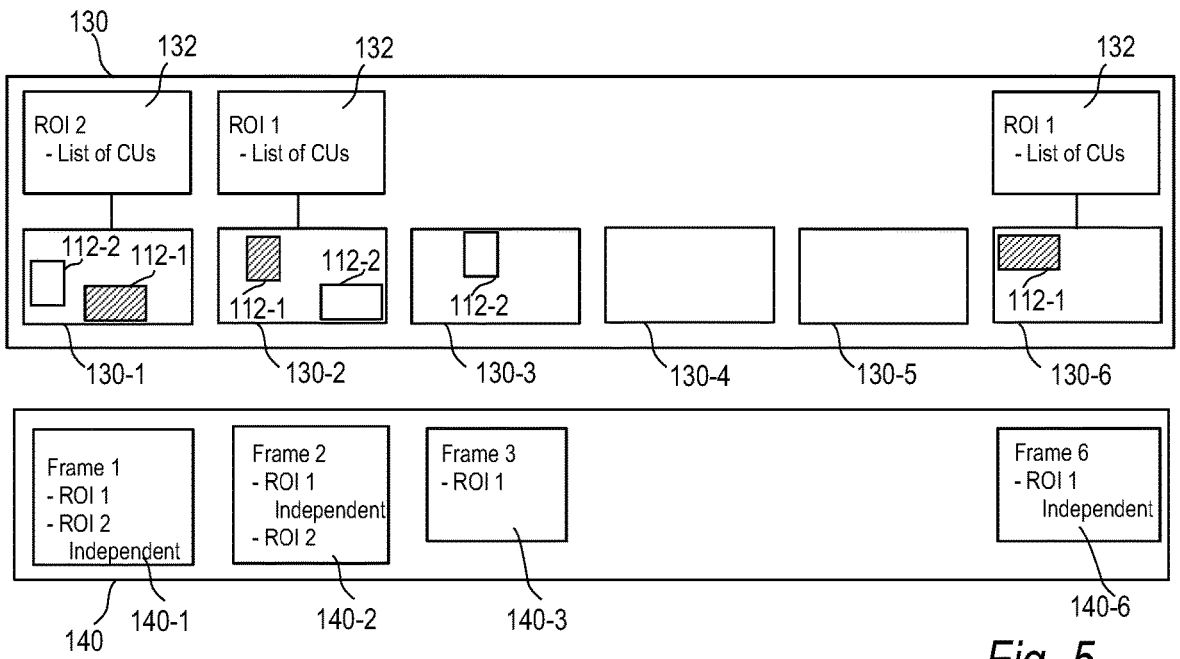
FIG. 5 schematically illustrates encoded video data and associated second metadata.

The encoding function 103 may generally encode the video data in the video frames 110-1 to 110-6 into corresponding encoded video frames 130-1, to 130-6 as shown in FIG. 5. As is known in the art of video coding, the video data in each video frame 110 may be divided into coding units, CUs, which each includes a block of pixels in a video frame, such as a block of 8×8 pixels, 16×16 pixels, or 32×32 pixels. Each CU is then either intra-frame coded (intra-coded in brief) meaning that it is predictively encoded using spatial prediction from already encoded video data in the same video frame; or inter-frame coded (inter-coded in brief) meaning that it is predictively encoded using temporal prediction from already encoded video data in one or more other video frames. In some frames, referred to as intra-frames, all CUs are intra-coded. In other frames, referred to as inter-frames, some CUs are intra-coded and others are inter-coded. It is standard practice to base the choice between intra-coding and inter-coding of a CU in an inter-frame on bitrate and distortion considerations. This standard practice is also employed by the encoding function 103 when encoding most of the CUs in the video data 120. However, the encoding function 103 does not apply this standard practice when encoding CUs that spatially overlap with the ROIs selected by the ROI selecting function 102. Instead, the encoding function 103 always intra-codes CUs that spatially overlap with a selected ROI.

In more detail, when encoding a video frame which includes one or more selected ROIs, the encoding function 103 performs sub-steps S108a, S108b, S108c, and S108d for each selected ROI within the video frame.

In sub-step S108a, the encoding function 103 associates the selected ROI in the video frame with a set of CUs that spatially overlap with the ROI. In order to find the set of CUs that spatially overlap with the ROI, the encoding function 103 may compare the spatial coverage of each CU in the video frame with the spatial coordinates in the first metadata 110 that define a spatial coverage of the ROI in the video frame. Those CUs having at least one pixel which is located in the ROI are included in the set of CUs.

In sub-step S108b the encoding function 130 encodes the video data in the set of CUs that spatially overlap with the ROI. The CUs in the set of CUs are encoded independently of video data in other video frames, i.e., they are intra-coded. Further, they are encoded independently of video data in CUs outside of the set of CUs in the same video frame. In other words, the encoding function 130 constrains the range of the spatial prediction used in the intra-coding to be within the set of CUs. A CU which is included in the set of CUs hence only refers to video data in CUs within the set. By encoding the set of CUs in this way, the video data within the ROI will be independently decodable by the decoding system 200.

In the example of FIG. 5, the striped pattern indicates that the set of CUs that correspond to the selected ROIs 112-1 are encoded in this independent fashion. The CUs within any non-identified ROI are encoded according to standard practice.

In sub-step S108c, the encoding function 103 embeds information 132 in the encoded video data 130 which associates the ROI with the set of CUs that spatially overlap with the ROI. The information 132 may be included in a header of the encoded video frame in which the ROI is present, or may be included in a dedicated supplementary enhancement information (SEI) frame which is inserted in the sequence of encoded video frames 130-1 to 130-6. By way of example, such an SEI frame may be inserted before the encoded video frame in which the ROI is present, or an SEI frame may be inserted once per GOP. In the latter case, the SEI frame may carry information 132 about all independently encoded ROIs in the GOP and the information 132 should not only specify the set of CUs being associated with the ROI, but also indicate in which frame the ROI is present. In the illustrated example of FIG. 5, the information 132 includes for each identified ROI 112-1 a list of CUs that spatially overlap with the identified ROI.

In step S108d the encoding function 103 generates second metadata 140 which identify the ROI and the encoded video frame in which it is present. The second metadata 140 may include data units 140-1, 140-2, 140-3, 140-6 which each identifies an encoded video frame in the encoded video data 130 and includes information about the independently decodable ROIs in that encoded video frame. As shown in FIG. 5, the second metadata hence identifies ROI 2 in encoded video frame 130-1, ROI 1 in encoded video frame 130-2, and ROI 1 in encoded video frame 130-6 as being independently decodable. The second metadata 140 may further identify the non-identified ROIs 112-2 which are not independently decodable and the encoded frames in which those are present. Similar to the first metadata 120 the second metadata 140 may include information about spatial coordinates of the ROIs, attributes of the ROIs, object identifiers such as track identifiers, and/or image properties of the ROIs. In some embodiments, the encoding function 103 may generate the second metadata 140 by updating the first metadata 120 where the update concerns adding the identification of which ROIs are independently decodable.

Figure 8:
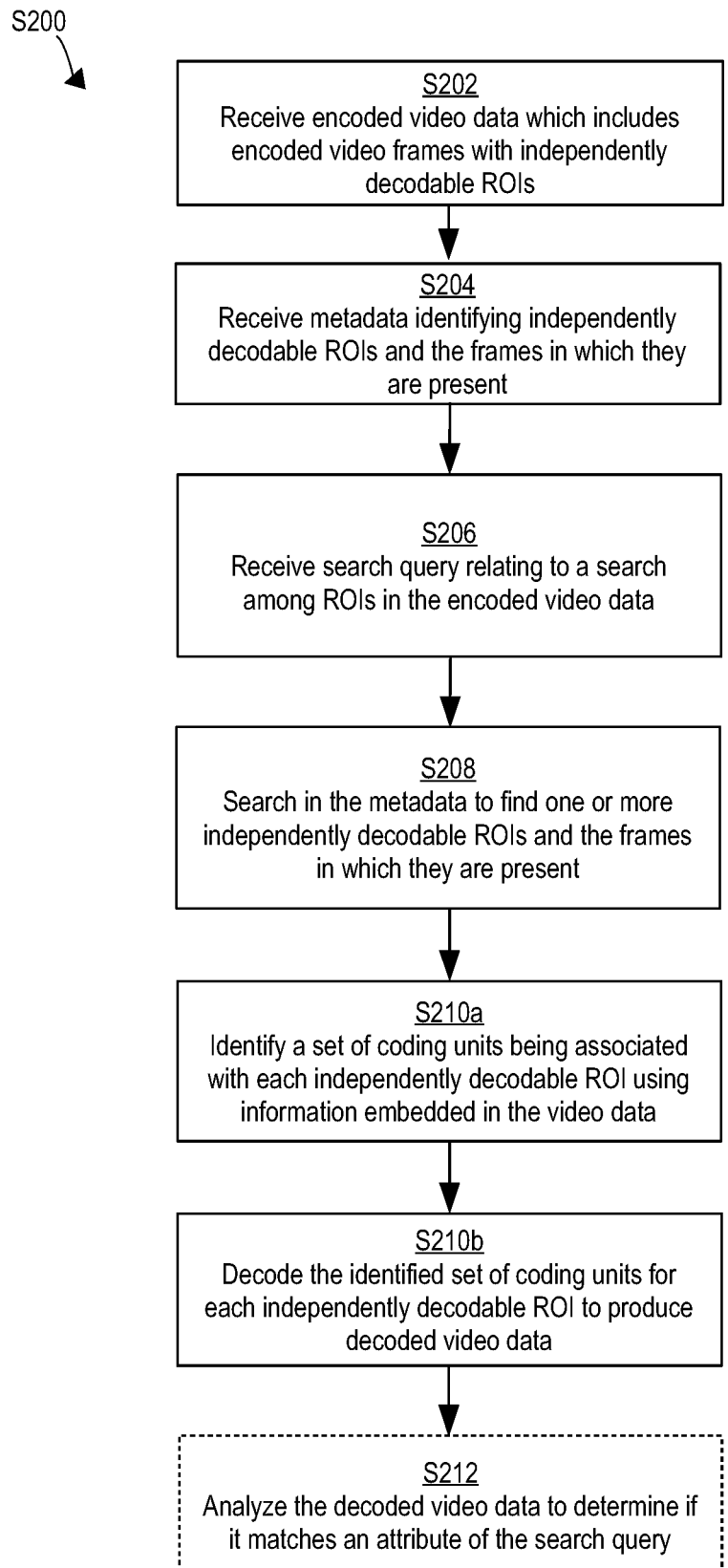
FIG. 8 is a flowchart of a decoding method according to embodiments.

The encoded video data 130 and the second metadata 140 are input to the decoding system 200. The operation of the decoding system 200 when carrying out a method S200 for decoding the video data in connection to performing a search in the video data will now be explained with reference to FIGS. 1, 3, 5-6, and the flow chart of FIG. 8.

In step S202, the receiving function 201 receives the encoded video data 130 which includes encoded video frames 130-1 to 130-6 in which there are independently decodable ROIs 112-1. As explained above, the encoded video data 130 may further include ROIs 112-2 which are not independently decodable.

In step S204, the receiving function 201 receives the second metadata 140 which identifies the independently decodable regions of interest 112-1 and the encoded frames 130-1, 130-2, 130-6 in which they are present. As described above, the second metadata 140 may also identify the other ROIs 112-2 which are not independently decodable, and the encoded video frames in which they are present.

In step S206, the search function 202 receives a search query 160. The search query 160 may be input by a user who wants to perform a search in the encoded video data 130. The search may concern a search among ROIs in the encoded video data 130, and in particular it may be a search for ROIs that match a particular attribute or a particular set of attributes. That attribute or set of attributes may be specified by the search query. By way of example, the search may concern searching for all objects of a specific object class in the encoded video data, such as a search for all cars or persons in the encoded video data. The search may concern searching for all objects which are of a specific class and additionally have another specific attribute, such as a search for all cars having a specified license plate number, all cars having a specified colour, all persons wearing clothes of a specific colour, or all persons wearing glasses. The search may also concern searching for all objects that match an image of a specific object. For example, a user may have found one instance of an object of interest in the video data and wants to find out if the object of interest is depicted elsewhere in the encoded video data. In the example to be described in connection to FIGS. 5 and 6 it will be assumed that the search query relates to a search for all sports cars in the encoded video data.

In response to receiving the search query 160, the search function 202 searches in the second metadata 140 to find one or more independently decodable ROIs 112-1 and the encoded video frames in which they are present. It is to be noted that the search function 103 at this stage further may find one or more ROIs 112-2 which are not independently decodable. Which one or ones of the ROIs 112-1, 112-2 that are searched for and found by the search function 202 in step S208 depends on whether or not the second metadata 140 is indicative of attributes of the ROIs.

In a first group of embodiments, the metadata 140 is indicative of attributes of the ROIs 112-1, 112-2. The search function 202 searches in step S208 in the metadata 140 to find one or more independently decodable ROIs 112-1, and possibly also one or more other ROIs 112-2, having an attribute or a set of attributes that match the particular attribute or set of attributes of the search query. To exemplify, if the second metadata 140 is indicative of which ROIs correspond to sports cars, the search function 202 would, responsive to a search query asking for sports cars, parse the second metadata 140 to find the ROIs 112-1, 112-2 that correspond sports cars. In the illustrated example of FIG. 5, the search function 202 would in that case find ROI 1 in encoded frame 130-6.

In a second group of embodiments, the metadata 140 is not indicative of any type of attributes of the ROIs 112-1, 112-2, or is indicative of some but not all types of attributes that are specified by the search query. In that case, the search function 202 cannot immediately deduce from the metadata 140 which one or ones of the ROIs that match the attribute or set of attributes specified by the search query. Instead, the search function 202 finds one or more independently decodable ROIs 112-1, and possibly one or more ROIs 112-2 which are not independently decodable, that are candidates for matching the search query. In some cases, these candidate ROIs include all independently decodable ROIs 112-1, for example when the second metadata 140 does not include any type of ROI attributes. In the example of FIG. 5, the search function would then identify all independently decodable ROIs 112-1 as being candidate ROIs. In other cases, the candidate ROIs could include a subset of the independently decodable ROIs 112-1, for example when the search query indicates a set of attributes of different types while the metadata 140 only includes attributes of a subset of these types. To exemplify, the second metadata 140 may be indicative of the object class of the ROIs, such as if they are persons or cars. However, the second metadata 140 may not specify further attributes of the persons or cars, such as if the person is a "male" or "female" or the car is of a "classic model" or "sports model". Upon receiving a search query for sports cars, the search function 103 may parse the metadata 140 to identify the independently decodable ROIs 112-1 which are cars, since these are candidates for also being sports cars.

The search function 202 then forwards an indication 142 to the decoding function 203 regarding the independently decodable ROIs 112-2, and any ROI 112-2 which is not independently decodable, that were found during the search. The indication 142 may be seen as an instruction to the decoding function 203 to decode the found ROIs. This indication could be in terms of identifiers of the found ROIs and the encoded video frames in which they are present. For example, the indication 142 could comprise pairs of identifiers where each pair includes an identifier of an encoded video frame and an identifier of a ROI therein, such as (Frame ID, ROI ID).

In order to decode the independently decodable ROIs found during the search, the decoding function 203 carries out steps S210*a* and S210*b* for each found independently decodable ROI. In step S210*a*, the decoding function 203 uses the information 132 embedded in the encoded video data 130 to identify a set of CUs that are associated with the independently decodable ROI. For example, the decoding function 203 can parse the information 132 embedded in the video data to find the ROI identifier in connection to the encoded video frame in which the ROI is present. Once this ROI identifier is found, the decoding function 203 can read the list of CUs in the encoded video frame that are associated with the ROI. In cases where the information 132 is embedded in a header of an encoded video frame or is included in an SEI frame which is inserted in connection to, such as right before or after, an encoded video frame, the decoding function 203 may use the identifier of the encoded video frame to turn to the header or the SEI frame associated with that encoded video frame, and then use the identifier of the ROI to identify the CUs being associated with the ROI. In cases where the information 132 is embedded in SEI frames which occur more seldom, such as once per GOP, the decoding function 203 may parse the SEI frame to find the pair of identifiers consisting of the ROI identifier and frame identifier, and then read out the list of CUs associated with that pair of identifiers.

Once the set of CUs which is associated with the independently decodable ROI in the encoded video frame has been identified, the decoding function 203 proceeds to selectively decode these CUs in step S210*b* to produce decoded video data corresponding to the independently decodable ROI. In order to do so, the decoding function 203 may parse the encoded video data 130 to find encoded video data associated with the identified CUs, and decode the encoded video data associated with the identified CUs separately from any other video data in other video frames or in other CUs of the present video frame. This is possible since the ROI was encoded by the encoder system 100 without referring to previously decoded video data in other frames or in CUs outside the identified set of CUs in the present frame. The decoding function 203 can hence decode the CUs in the identified set of CUs without having to first decode video data in other encoded video frames or in CUs outside of the set of CUs in the same encoded video frame.

It is noted that the decoding function 203 also may decode video data of ROIs 112-2 which were found by the search function 202 but which are not independently decodable. Since the video data in those ROIs 112-2 typically is encoded according to standard practice with reference to previously decoded video data in other video frames or to CUs outside of the ROI in the same video frame, those ROIs 112-1 cannot be decoded separately but require the decoding to start from the preceding intra-coded frame.

In the end, the decoding system 200 outputs decoded video data 150 which matches the attributes given by the search query. In the first group of embodiments, where the ROIs found by the search function 202 are already known to match the attributes specified by the search query, the decoded video data produced by the decoding function 203 may be output to a user as decoded video 150 that matches the attributes of the search query. This option is indicated by the dashed arrow 150 leading out of the decoding function 203 in FIG. 3.

Figure 6:
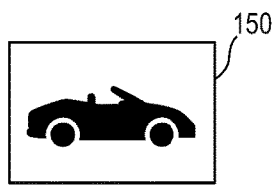
FIG. 6 schematically illustrates an output of the video decoding system.

In the second group of embodiments, where the ROIs found by the search function 202 instead are candidates for matching the attributes specified by the search query, the decoding function 203 forwards the decoded video data 132 of the candidate ROIs to the analytics function 206. The analytics function 206 analyzes the decoded video data 132 corresponding to each ROI to determine if it matches the particular attribute or set of attributes specified by the search query 160. When a match is found, the decoded video data of that ROI is output as decoded video data 150 that matches the search query. The analytics function 206 may generally implement any known analytics methods for this purpose, such as analytics methods implemented by convolutional neural networks. The methods implemented by the analytics function 206 may depend on the type of search attributes that should be supported by the decoding system 200. For example, if a search for objects of particular predefined object classes should be supported, the analytics function 206 may implement an object classification method which takes the decoded video data 132 of an ROI as input and determines an object class of the object depicted by the video data. If the determined object class matches that of the search query, the decoded video data of that ROI may be output as decoded video data 150 matching the search query 160. In the example of FIG. 5 where the search query 160 is for sports cars, the sports cars should be among the predefined classes that the object classification methods support. The decoding system 100 will then output decoded video data 150 depicting the sports car as shown in FIG. 6.

In another example, where the search is for a particular object depicted by an image, the analytics function 206 may implement a re-identification method which outputs a similarity score reflecting the similarity between the object depicted in the video data of the ROI and the image of the particular object. If the score is higher than a threshold, the decoded video data of the ROI may output as decoded video data 150 matching the search query 160. It is understood that there are many more examples of analytics methods that could be included in the analytics function 206, including methods for recognizing colours, poses, items worn or carried by objects etc. Such analytics methods, including standard classifiers trained to classify colours, OpenPose (arXiv:1812.08008) for recognizing poses, Mask-RCNN (arXiv:1703.06870) or single shot detector (SSD) (arXiv: 1512.02325) for detecting objects of given categories, are per se known in the art and are therefore not further described herein.

It will be appreciated that a person skilled in the art can modify the above-described embodiments in many ways and still use the advantages of the disclosure as shown in the embodiments above. Thus, the disclosure should not be limited to the shown embodiments but should only be defined by the appended claims. Additionally, as the skilled person understands, the shown embodiments may be combined.

The invention claimed is:

1. A method for decoding video data to perform a search in the video data, comprising:
receiving encoded video data which includes encoded video frames in which there are independently decodable regions of interest, wherein an independently decodable region of interest in a video frame is decodable by only using or referring to encoded video data in coding units of the encoded video frame that spatially overlap with the region of interest,
receiving, as a data entity which is separate from the encoded video data, metadata comprising data units which each includes an identifier of an encoded video frame, an identifier of each region of interest in the encoded video frame, and an identification of which regions of interest in the encoded video frame that are independently decodable,
wherein the encoded video data embeds information which associates the identifier of each region of interest being identified as independently decodable in the metadata with a set of coding units that spatially overlap with the region of interest,
receiving a search query relating to a search among regions of interest in the encoded video data,
in response to receiving the search query, searching the metadata to find and provide identifiers of one or more regions of interest which are identified as independently decodable and the encoded video frames in which they are present,
for each found region which is present in an encoded video frame:
identifying a set of coding units being associated with the identifier of the region of interest by using the information embedded in the encoded video data, and
decoding the identified set of coding units of the encoded video frame independently of video data in other video frames and independently of video data in coding units outside of the set of coding units in the encoded video frame to produce decoded video data corresponding to the region of interest.

2. The method for decoding video data of claim 1, wherein
the metadata further is indicative of attributes of the regions of interest, and the search query relates to a search among regions of interest in the encoded video having a particular attribute, and
the searching includes searching the metadata to find one or more regions of interest which are identified as independently decodable and having an attribute that matches the particular attribute of the search query.

3. The method for decoding video data of claim 1, wherein the search query relates to a search among regions of interest in the encoded video data having a particular attribute, and the method further comprises:
analyzing the decoded video data corresponding to the region of interest to determine if it matches the particular attribute of the search query.

4. The method for decoding video data of claim 1, wherein coding units in the encoded video data which are associated with an identifier of a region of interest being identified as independently decodable in the metadata are intra-encoded.

5. A method for encoding video data, comprising:
receiving video data which includes video frames in which there are regions of interest,
receiving first metadata which includes identifiers of the regions of interest and identifiers of the video frames in which the regions of interest are present,
selecting, by using the received first metadata, one or more video frames and one or more regions of interest in each of them,
encoding the video data to produce encoded video data, wherein the encoding of each selected video frame and each selected region of interest therein includes:
associating the region of interest with a set of coding units that spatially overlap with the region of interest,
encoding video data of the video frame in the set of coding units that spatially overlap with the region of interest independently of video data in other video frames and independently of video data in coding units outside of the set of coding units in the video frame,
embedding information in the encoded video data which associates an identifier of the region of interest with the set of coding units that spatially overlap with the region of interest, and
generating second metadata which includes the identifier of the region of interest, an identifier of the video frame and an identification of the region of interest as being independently decodable, wherein the second metadata is a data entity which is separate from the encoded video data.

6. The method for encoding video data of claim 5, wherein the selected one or more video frames include a strict subset of the video frames in which there are regions of interest.

7. The method for encoding video data of claim 5, wherein the received first metadata further identifies a plurality of regions of interest in subsequent video frames as belonging to a common track, wherein the selected one or more video frames include fewer than all of said subsequent video frames.

8. The method for encoding video data of claim 5, wherein the selected one or more video frames and the selected one or more regions of interest in each of them are further identified based on closeness of image properties within the regions of interest to target image properties.

9. The method for encoding video data of claim 5, wherein an amount of pixels in the video data covered by the selected one or more regions of interest in the selected one or more video frames is less than a predetermined proportion of a total amount of pixels in the video data per time unit or per identified video frame.

10. The method for encoding video data of claim 5, further comprising analyzing video data within the regions of interest to associate them with attributes, and including the attributes of the regions of interest in the second metadata.

11. The method for encoding video data of claim 5, wherein the video data in the set of coding units that spatially overlap with the region of interest are intra-encoded.

12. A decoding system for decoding video data in connection to performing a search in the video data, comprising circuitry configured to implement
  a receiving function configured to receive encoded video data which includes encoded video frames in which there are independently decodable regions of interest, wherein an independently decodable region of interest in a video frame is decodable by only using or referring to encoded video data in coding units of the encoded video frame that spatially overlap with the region of interest, and to receive, as a data entity which is separate from the encoded video data, metadata comprising data units which each includes an identifier of an encoded video frame, an identifier of each region of interest in the encoded video frame, and an identification of which regions of interest in the encoded video frame that are independently decodable,
  wherein the encoded video data embeds information which associates the identifier of each region of interest being identified as independently decodable in the metadata with a set of coding units that spatially overlap with the region of interest,
  a search function configured to receive a forensic search query relating to a search among regions of interest in the encoded video data, and in response to receiving the forensic search query, search the metadata to find and provide identifiers of one or more regions of interest which are identified as independently decodable and the encoded video frames in which they are present,
  a decoding function which is configured to, for each found region of interest which is present in an encoded video frame:
    identify a set of coding units being associated with the identifier of the region of interest by using the information embedded in the encoded video data, and
    decode the identified set of coding units of the encoded video frame independently of video data in other video frames and independently of video data in coding units outside of the set of coding units in the encoded video frame to produce decoded video data corresponding to the region of interest.

13. An encoding system for encoding video data, comprising circuitry which is configured to implement:
  a receiving function configured to receive video data which includes video frames in which there are regions of interest, and to receive first metadata which includes identifiers of the regions of interest and identifier of the video frames in which they are present,
  a region of interest selecting function configured to select, by using the received first metadata, one or more video frames and one or more regions of interest in each of them,
  an encoding function configured to encode the video data to produce encoded video data, wherein encoding of each selected video frame and each selected region of interest therein includes:
    associating the region of interest with a set of coding units that spatially overlap with the region of interest,
    encoding video data of the video frame in the set of coding units that spatially overlap with the region of interest independently of video data in other video frames and independently of video data in coding units outside of the set of coding units in the video frame,
    embedding information in the encoded video data which associates an identifier of the region of interest with the set of coding units that spatially overlap with the region of interest, and
    generating second metadata which includes the identifier of the region of interest, an identifier of the video frame and an identification of the region of interest as being independently decodable, wherein the second metadata is a data entity which is separate from the encoded video data.

14. A non-transitory computer-readable medium having computer-code instructions stored thereon which, when executed by a device having processing capability, causes the device to carry out the method for decoding video data to perform a search in the video data, comprising:
  receiving encoded video data which includes encoded video frames in which there are independently decodable regions of interest, wherein an independently decodable region of interest in a video frame is decodable by only using or referring to encoded video data in coding units of the encoded video frame that spatially overlap with the region of interest,
  receiving, as a data entity which is separate from the encoded video data, metadata comprising data units which each includes an identifier of an encoded video frame, an identifier of each region of interest in the encoded video frame, and an identification of which regions of interest in the encoded video frame that are independently decodable,
  wherein the encoded video data embeds information which associates the identifier of each region of interest being identified as independently decodable in the metadata with a set of coding units that spatially overlap with the region of interest,
  receiving a search query relating to a search among regions of interest in the encoded video data,
  in response to receiving the search query, searching the metadata to find and provide identifiers of one or more regions of interest which are identified as independently decodable and the encoded video frames in which they are present,
  for each found region which is present in an encoded video frame:
    identifying a set of coding units being associated with the identifier of the region of interest by using the information embedded in the encoded video data, and
    decoding the identified set of coding units of the encoded video frame independently of video data in other video frames and independently of video data in coding units outside of the set of coding units in the encoded video frame to produce decoded video data corresponding to the region of interest.

* * * * *